(No Model.)
O. B. SHALLENBERGER.
ELECTRIC INDICATOR.
No. 380,942. Patented Apr. 10, 1888.
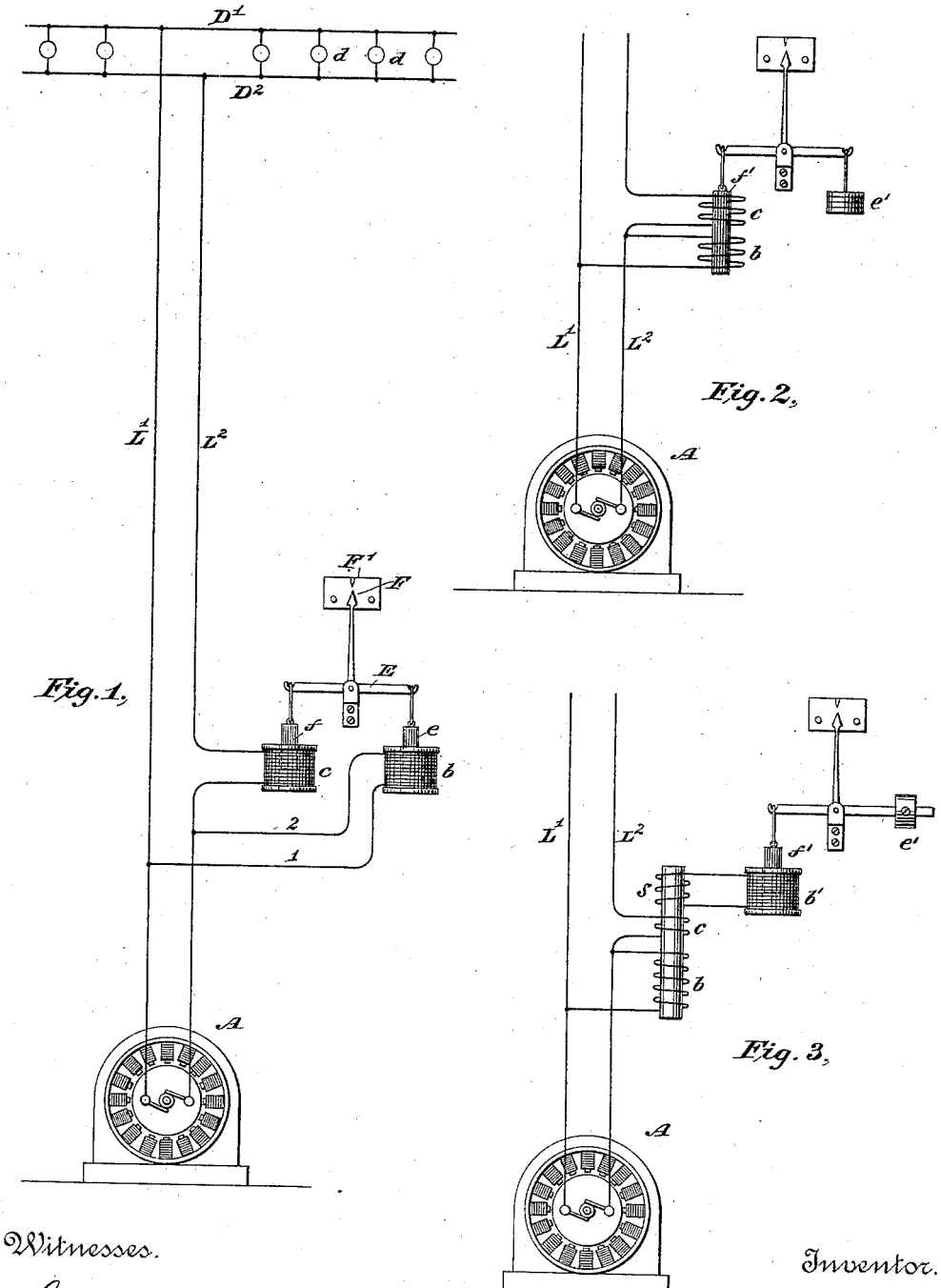
Witnesses.
Geo. W. Breck
Carrie E. Ashley
Inventor.
O. B. Shallenberger.
By his Attorneys,
Pope Edgecomb & Perry.

UNITED STATES PATENT OFFICE.

OLIVER B. SHALLENBERGER, OF ROCHESTER, ASSIGNOR TO GEORGE WESTINGHOUSE, JR., OF PITTSBURG, PENNSYLVANIA.

ELECTRIC INDICATOR.

SPECIFICATION forming part of Letters Patent No. 380,942, dated April 10, 1888.

Application filed April 23, 1887. Serial No. 235,838. (No model.)

*To all whom it may concern:*

Be it known that I, OLIVER B. SHALLENBERGER, a citizen of the United States, residing in Rochester, Beaver county, in the State of Pennsylvania, have invented certain new and useful Improvements in Electric Indicators, of which the following is a specification.

The invention relates to the class of apparatus employed for indicating at any time the current upon an electric circuit; and the object is to provide convenient means for determining and regulating at a central station the potential upon the work-circuit.

The invention consists in deriving from the main circuit currents having a potential directly dependent upon the difference of potential at the terminals of the generator and currents upon a second circuit having a potential dependent upon or affected by the loss or drop upon the lines when that loss is sufficient to cause an appreciable effect on the work-circuit. The effects of the currents thus derived are balanced against or caused to oppose each other, and the resultant indicates the difference of potential existing upon the work-circuit.

The invention will be described particularly in connection with the accompanying drawings, in which—

Figure 1 is a diagram illustrating an organization of circuits for carrying out the invention in one of its simpler forms, and Figs. 2 and 3 illustrate modifications.

Referring to Fig. 1, A represents an electric generator or other suitable source of electric currents, and $L'$ $L^2$ represent two lines leading from the respective poles thereof to a work-circuit, $D'$ $D^2$, containing translating devices $d$ $d$, designed to be operated by electrical currents. At or near the central station a solenoid, $b$, is connected in circuit between conductors $L'$ and $L^2$ by the conductors 1 and 2. A second coil, $c$, is connected in the direct circuit of the conductor $L^2$. The coil $b$ is provided with a core, $e$, preferably consisting of a bundle of soft-iron wires magnetically separated from each other, and the coil $c$ is provided with a similar core, $f$. These two cores are suspended from opposite ends of a beam, E, pivoted at its center and carrying an indicator, F, applied to a scale or index-plate, F'. The coil $b$ is so proportioned as to maintain a balance when no current is flowing in the coil $c$ and a normal difference of potential exists at the terminals of the generator. When very little current flows through the main-line circuit $L'$ $L^2$, the difference of potential at the generator is practically the same as at the lamps or translating devices $d$ $d$; but as the current increases the loss in the line increases proportionately, and hence to preserve the normal difference of potential at the translating devices the difference of potential at the generator must be increased. This would tend to throw the indicator out of balance, carrying the pointer F toward the right hand, but for the action of coil $c$, which, being traversed by the main current, tends to restore the equilibrium. If the loss in the main-line circuit amounts to, say, approximately ten per cent. of the useful work at a full load, then the difference of potential at the dynamo should be ten per cent. higher than when the load is very small. If, therefore, the coil $c$ has an effect equal to one-eleventh that of the coil $b$, the balance will still be maintained. When operating under half the full load, the loss is five per cent., and the effect of the coil $c$ is approximately five per cent., since the current passing through it is reduced to one-half its former value. In this manner the indicator will serve to show when the difference of potential at the translating devices is at its required value.

In Fig. 2 there is shown a modification in which the coils $b$ and $c$ are applied to the same core, $f'$, a weight, $e'$, being opposed thereto in place of the core $e$. These two coils act oppositely upon the core $f'$. The weight $e'$ is adjusted so that when no current traverses the main circuit it will balance the pull upon the core $f'$ at the normal difference of potential.

In Fig. 3 an organization is shown adapted for alternating currents, in which the coil $c$ constitutes a portion of the primary coil of a converter, and the coil $b$ a second portion, while a coil, $s$, constitutes the secondary coil. The coil $b$ is connected between the conductors $L'$ and $L^2$, as before, and the coil $c$ is connected in the circuit of the conductor L². The two coils act in opposition to each other, and the current induced in the secondary s will be due to the difference of the effects of the currents in the two coils b and c. The effects of the coils b and c are such that the resultant current in the coil b' maintains a balance at the proper electro-motive force for the current passing, a weight, e', being opposed to the core f'.

In another application filed by me December 9, 1887, Serial No. 257,408, claims are made particularly upon the use of a converter in the manner described with reference to Fig. 3.

I do not limit myself to an indicator of the form shown. Any suitable means of indication may be used to which the above-described organization is applicable.

I claim as my invention—

1. In an indicator for electric circuits, the combination of two opposing coils, the one connected in a shunt-circuit with the translating devices and the second in a series therewith at or near the source of electricity, substantially as described.

2. The combination, with a source of electricity, of two opposing coils, one connected in a shunt and the other in a series with the work-circuit, and an indicator affected by the currents traversing the coils, substantially as described.

3. An indicator for electric circuits, consisting of two coils, one connected in shunt upon and the other in series with the work-circuit, one of said coils being adjusted to secure a predetermined per cent. greater effect per unit of current than the other, and an index operated by the coils.

In testimony whereof I have hereunto subscribed my name this 6th day of April, A. D. 1887.

OLIVER B. SHALLENBERGER.

Witnesses:
W. D. UPTEGRAFF,
LEW B. STILLWELL.